(12) United States Patent
Conner et al.

(10) Patent No.: US 9,482,840 B2
(45) Date of Patent: Nov. 1, 2016

(54) PORT MAPPING FOR SERIES CONNECTED FIBER OPTIC TERMINALS

(75) Inventors: Mark E. Conner, Granite Falls, NC (US); Kevin L. Strause, Keller, TX (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 650 days.

(21) Appl. No.: 12/472,849

(22) Filed: May 27, 2009

(65) Prior Publication Data

US 2010/0303408 A1 Dec. 2, 2010

(51) Int. Cl.
*G02B 6/38* (2006.01)
*G02B 6/36* (2006.01)
*G02B 6/44* (2006.01)

(52) U.S. Cl.
CPC .......... *G02B 6/4475* (2013.01); *G02B 6/3885* (2013.01); *G02B 6/3825* (2013.01)

(58) Field of Classification Search
CPC . G02B 6/3897; G02B 6/3885; G02B 6/3825
USPC ..................... 385/17, 24, 53, 54, 59, 71, 89, 385/100–116, 134, 135
See application file for complete search history.

(56) References Cited

U.S. PATENT DOCUMENTS

| | | |
|---|---|---|
| 4,611,887 A | 9/1986 | Glover et al. |
| 4,699,460 A | 10/1987 | Szentesi |
| 5,204,925 A | 4/1993 | Bonanni et al. |
| 5,613,070 A | 3/1997 | Born |
| 6,185,358 B1 | 2/2001 | Park |
| 6,219,479 B1 | 4/2001 | Madden et al. |
| 6,224,269 B1 * | 5/2001 | Engstrand et al. ............ 385/59 |
| 6,275,643 B1 | 8/2001 | Bandy et al. |
| 6,351,582 B1 | 2/2002 | Dyke et al. |
| 6,364,539 B1 | 4/2002 | Shahid |

(Continued)

FOREIGN PATENT DOCUMENTS

| | | | |
|---|---|---|---|
| CN | 1613024 A | 5/2005 | ............... G02B 6/44 |
| EP | 1065544 A2 | 1/2001 | |

(Continued)

OTHER PUBLICATIONS

Patent Cooperation Treaty, International Search Report for International Application No. PCT/US2010/035939, Aug. 16, 2010, 1 page.

(Continued)

*Primary Examiner* — Kaveh C Kianni
*Assistant Examiner* — Hung Lam

(57) ABSTRACT

Fiber optic cable assemblies and fiber optic terminals supporting port mapping for series connected fiber optic terminals are disclosed. In one embodiment, a fiber optic cable assembly is provided. The fiber optic cable assembly includes a fiber optic cable having a plurality of optical fibers disposed therein between a first end and a second end of the fiber optic cable. The plurality of optical fibers on the first end of the fiber optic cable are provided according to a first mapping. The plurality of optical fibers on the second end of the fiber optic cable are provided according to a second mapping. In this regard, the fiber optic cable assembly provides port mapping of optical fibers to allow multiple fiber optic terminals having the same internal fiber mapping to be connected in series in any order, while providing the same connectivity to each of the terminals in the series.

23 Claims, 8 Drawing Sheets

(56) References Cited

U.S. PATENT DOCUMENTS

| | | |
|---|---|---|
| 6,402,393 B1 | 6/2002 | Grimes et al. |
| 6,464,404 B1 | 10/2002 | Robinson et al. ............. 385/54 |
| 6,496,641 B1 | 12/2002 | Mahony |
| 6,501,900 B1 | 12/2002 | Aloisio, Jr. et al. |
| 6,554,483 B1 | 4/2003 | Sun et al. |
| 6,621,975 B2 | 9/2003 | Laporte et al. |
| 6,694,083 B2 | 2/2004 | Paradiso et al. |
| 6,758,600 B2 | 7/2004 | Del Grosso et al. |
| 6,869,227 B2 | 3/2005 | Del Grosso et al. |
| 7,088,981 B2 | 8/2006 | Chang |
| 7,147,383 B2 | 12/2006 | Sullivan |
| 7,237,966 B2 | 7/2007 | Quinby et al. |
| 7,354,202 B1 | 4/2008 | Luger |
| 7,391,952 B1 | 6/2008 | Ugolini et al. |
| 7,542,653 B2 | 6/2009 | Johnson et al. |
| 7,603,044 B1 | 10/2009 | Conroy et al. |
| 7,646,981 B2 | 1/2010 | Coffey |
| 7,689,079 B2 * | 3/2010 | Burnham ............. G02B 6/3897 385/15 |
| 7,756,371 B1 | 7/2010 | Burnham et al. |
| 8,009,959 B2 | 8/2011 | Barnes et al. |
| 8,251,591 B2 | 8/2012 | Barnes et al. |
| 8,737,837 B2 | 5/2014 | Conner et al. |
| 8,821,036 B2 | 9/2014 | Shigehara |
| 8,873,967 B2 * | 10/2014 | Barnes ................ G02B 6/4453 385/24 |
| 9,207,421 B2 | 12/2015 | Conner |
| 2002/0015563 A1 | 2/2002 | Murakami et al. |
| 2002/0181925 A1 | 12/2002 | Hodge et al. |
| 2003/0044141 A1 | 3/2003 | Melton et al. |
| 2003/0072537 A1 * | 4/2003 | Eichenberger et al. ........ 385/89 |
| 2003/0210861 A1 | 11/2003 | Weiss et al. |
| 2004/0062498 A1 | 4/2004 | Del Grosso et al. |
| 2004/0179771 A1 | 9/2004 | Verhagen et al. |
| 2004/0184741 A1 | 9/2004 | Del Grosso et al. |
| 2005/0036749 A1 * | 2/2005 | Vogel et al. .................. 385/100 |
| 2005/0152640 A1 | 7/2005 | Lemoff |
| 2005/0163448 A1 | 7/2005 | Blackwell, Jr. et al. |
| 2005/0207709 A1 | 9/2005 | Del Grosso et al. |
| 2006/0029334 A1 | 2/2006 | Quinby et al. |
| 2006/0034573 A1 | 2/2006 | Guan et al. |
| 2006/0045521 A1 | 3/2006 | Emery et al. |
| 2006/0133736 A1 | 6/2006 | Sullivan |
| 2006/0269208 A1 | 11/2006 | Allen |
| 2006/0280420 A1 | 12/2006 | Blackwell et al. |
| 2007/0071392 A1 * | 3/2007 | Baucom et al. ............. 385/100 |
| 2007/0189694 A1 | 8/2007 | Mullaney et al. |
| 2008/0152292 A1 * | 6/2008 | Wilken et al. ................ 385/135 |
| 2008/0175548 A1 | 7/2008 | Knecht et al. ................ 385/100 |
| 2008/0193091 A1 | 8/2008 | Herbst |
| 2008/0205819 A1 * | 8/2008 | Johnson et al. ................ 385/17 |
| 2008/0205824 A1 | 8/2008 | Cody et al. |
| 2008/0279506 A1 | 11/2008 | Kerry et al. |
| 2009/0103879 A1 | 4/2009 | Tang et al. |
| 2009/0154888 A1 | 6/2009 | Abbott, III et al. |
| 2009/0169163 A1 | 7/2009 | Abbott, III et al. |
| 2009/0180737 A1 | 7/2009 | Burnham et al. |
| 2009/0263089 A1 | 10/2009 | Keller et al. |
| 2009/0290844 A1 | 11/2009 | Mullaney et al. |
| 2010/0092129 A1 | 4/2010 | Conner ........................... 385/17 |
| 2010/0092133 A1 | 4/2010 | Conner |
| 2010/0092146 A1 * | 4/2010 | Conner et al. ................ 385/135 |
| 2010/0092169 A1 | 4/2010 | Conner et al. |
| 2010/0092171 A1 * | 4/2010 | Conner ........................... 398/49 |
| 2010/0098386 A1 | 4/2010 | Kleeberger |
| 2010/0195955 A1 | 8/2010 | Burnham et al. |
| 2010/0303408 A1 | 12/2010 | Conner et al. |
| 2010/0322554 A1 | 12/2010 | Barnes et al. |
| 2011/0103803 A1 | 5/2011 | Kolesar |
| 2011/0129226 A1 | 6/2011 | Vleugels et al. |
| 2011/0274400 A1 | 11/2011 | Mudd et al. |
| 2011/0293277 A1 | 12/2011 | Bradea et al. |
| 2012/0189259 A1 | 7/2012 | Manes |
| 2012/0288233 A1 | 11/2012 | Barnes et al. |
| 2013/0163932 A1 | 6/2013 | Cooke et al. |
| 2014/0140660 A1 | 5/2014 | Buff et al. |
| 2014/0254986 A1 | 9/2014 | Kmit et al. |

FOREIGN PATENT DOCUMENTS

| | | | |
|---|---|---|---|
| WO | 0244782 A2 | 6/2002 | |
| WO | WO03/016975 A2 | 2/2003 | ............... G02B 6/46 |
| WO | 2005114286 A1 | 12/2005 | |
| WO | 2010044967 | 4/2010 | |
| WO | 2010044979 A1 | 4/2010 | |
| WO | 2010093794 A1 | 8/2010 | |
| WO | 2011053409 A1 | 5/2011 | |

OTHER PUBLICATIONS

Non-final Office Action for U.S. Appl. No. 13/559,070 mailed Sep. 27, 2012, 7 pages.

Final Office Action for U.S. Appl. No. 13/559,070 mailed Oct. 1, 2013, 8 pages.

Kolesar et al., "Clause 86 MDI Optical Pin Layout and Connector," IEEE P802.3ba, Jan. 2009, 24 pages.

Author Unknown, "TIA Standard: Optical Fiber Cabling Components Standard," TIA-568-C.3, Telecommunications Industry Association, Jun. 2008, 38 pages.

Author Unknown, "Parallel Optics," Applications Engineering Note 123, Rev 0, Corning Cable Systems LLC, Mar. 23, 2008, 4 pages.

Author Unknown, "Fiber Systems: Best Practices for Ensuring Polarity of Array-Based Fiber Optic Channels," White Paper, Panduit Corp., 2008, 10 pages.

Stewart, "Optical Assembly Plant: Base 8 Ribbon Module Jumper "Classic"," Flyer 0000009429-EN, Corning Cable Systems, Jan. 23, 2008, 1 page.

Author Unknown, "Data Center Fabric: Corning Cable Systems Optical Cabling Solutions for Brocade," Technical Brief, GA-TB-052-01, Brocade Communications Systems, Inc., Sep. 2008, 26 pages.

Author Unknown, "U-Space System for Brocade 48000," Product Specifications, LAN-904-EN, Corning Cable Systems LLC, Apr. 2008, 16 pages.

Author Unknown, "U-Space System for Brocade SAN Directors," Specification Sheet, LAN-904-EN, Corning Cable Systems LLC, Oct. 2010, 8 pages.

Author Unknown, "Base 8 Modules," Standard Recommended Procedure 003-121, Issue 1, Corning Cable Systems LLC, Apr. 2008, 3 pages.

Author Unknown, "QSFP (Quad Small Formfactor Pluggable) Transceiver," INF-8438i Specification, SFF Committee, Rev 1.0, Nov. 2006, 75 pages.

Chinese First Office Action, Patent Application No. 201080023235. 2, Date of Issue Mar. 11, 2013, 1 page.

Non-final Office Action for U.S. Appl. No. 12/288,231 mailed May 25, 2011, 10 pages.

Final Office Action for U.S. Appl. No. 12/288,231 mailed Nov. 14, 2011, 6 pages.

Advisory Action for U.S. Appl. No. 12/288,231 mailed Apr. 5, 2012, 3 pages.

Non-final Office Action for U.S. Appl. No. 12/323,356 mailed Sep. 30, 2011, 15 pages.

Final Office Action for U.S. Appl. No. 12/323,356 mailed Mar. 2, 2012, 18 pages.

Non-final Office Action for U.S. Appl. No. 12/323,385 mailed Sep. 21, 2011, 10 pages.

Final Office Action for U.S. Appl. No. 12/323,385 mailed Mar. 6, 2012, 12 pages.

Advisory Action for U.S. Appl. No. 12/323,385 mailed Jun. 15, 2012, 2 pages.

Non-final Office Action for U.S. Appl. No. 10/805,892 mailed Aug. 10, 2004, 4 pages.

Notice of Allowance for U.S. Appl. No. 10/805,892 mailed Dec. 21, 2004, 5 pages.

Non-final Office Action for U.S. Appl. No. 11/020,730 mailed Feb. 28, 2006, 6 pages.

(56) References Cited

OTHER PUBLICATIONS

Notice of Allowance for U.S. Appl. No. 11/020,730 mailed Sep. 20, 2006, 7 pages.
Non-final Office Action for U.S. Appl. No. 12/486,427 mailed Mar. 5, 2010, 5 pages.
Notice of Allowance for U.S. Appl. No. 12/486,427 mailed Aug. 27, 2010, 6 pages.
Notice of Allowance for U.S. Appl. No. 12/486,427 mailed Jun. 13, 2011, 7 pages.
Non-final Office Action for U.S. Appl. No. 12/486,427 mailed Oct. 21, 2010, 5 pages.
Notice of Allowance for U.S. Appl. No. 12/486,473 mailed May 29, 2012, 9 pages.
Non-final Office Action for U.S. Appl. No. 12/486,473 mailed Sep. 29, 2011, 4 pages.
Non-final Office Action for U.S. Appl. No. 12/323,344 mailed Aug. 18, 2011, 8 pages.
Notice of Allowance for U.S. Appl. No. 12/323,344 mailed Jan. 9, 2012, 9 pages.
Non-final Office Action for U.S. Appl. No. 12/323,395 mailed Dec. 8, 2011, 7 pages.
International Search Report for PCT/US2009/056880 mailed Nov. 9, 2009, 3 pages.
International Search Report for PCT/US2009/057128 mailed Nov. 9, 2009, 2 pages.
International Search Report for PCT/US2009/057140 mailed Nov. 9, 2009, 3 pages.
International Search Report for PCT/US2009/057244 mailed Nov. 9, 2009, 4 pages.
International Preliminary Report on Patentability for PCT/US2009/057244 mailed Apr. 19, 2011, 7 pages.
Tanji et al., "Optical Fiber Cabling Technologies for Flexible Access Network," Optical Fiber Technology, Academic Press, London, US, vol. 14, No. 3, Jul. 1, 2008, 8 pages.
Author Unknown, "High Density PARA-OPTIX Cable Assemblies and Enclosures," Tyco Electronics, 2007, 2 pages.
Non-final Office Action for U.S. Appl. No. 12/288,231 mailed Feb. 13, 2014, 7 pages.
Notice of Allowance for U.S. Appl. No. 12/323,356 mailed Jan. 17, 2014, 7 pages.
Non-final Office Action for U.S. Appl. No. 12/323,395 mailed Apr. 17, 2014, 15 pages.
Quayle Action for U.S. Appl. No. 13/557,671 mailed Dec. 6, 2013, 4 pages.
Notice of Allowance for U.S. Appl. No. 13/557,671 mailed Jun. 25, 2014, 6 pages.
Non-final Office Action for U.S. Appl. No. 13/559,070 mailed Apr. 3, 2014, 8 pages.
International Search Report for PCT/US2013/051424 mailed Oct. 21, 2013, 4 pages.
Final Office Action for U.S. Appl. No. 12/323,395, mailed Oct. 9, 2014, 10 pages.
Applicant-Initiated Interview Summary for U.S. Appl. No. 13/557,671, mailed Oct. 9, 2014, 3 pages.
Non-final Office Action for U.S. Appl. No. 13/649,392 mailed Oct. 2, 2014, 13 pages.
Non-final Office Action for U.S. Appl. No. 13/751,232 mailed Sep. 17, 2014, 8 pages.
International Search Report for PCT/US2013/069548 mailed Feb. 6, 2014, 4 pages.
Notice of Allowance for U.S. Appl. No. 13/557,671 mailed Feb. 17, 2015, 7 pages.
Final Office Action for U.S. Appl. No. 13/751,232 mailed Jan. 23, 2015, 11 pages.
Non-Final Office Action for U.S. Appl. No. 14/448,252 mailed Dec. 4, 2014, 12 pages.
Notice of Allowance for U.S. Appl. No. 12/323,395 mailed Jan. 7, 2015, 6 pages.
Final Office Action for U.S. Appl. No. 13/559,070 mailed Jan. 13, 2015, 8 pages.
International Preliminary Report on Patentability for PCT/US2013/051424 mailed Feb. 5, 2015, 9 pages.
AU2010524249 Examination Report No. 1 Mailed Jul. 19, 2014.
EP10720238.4 Office Action Dated Jan. 4, 2012.

* cited by examiner

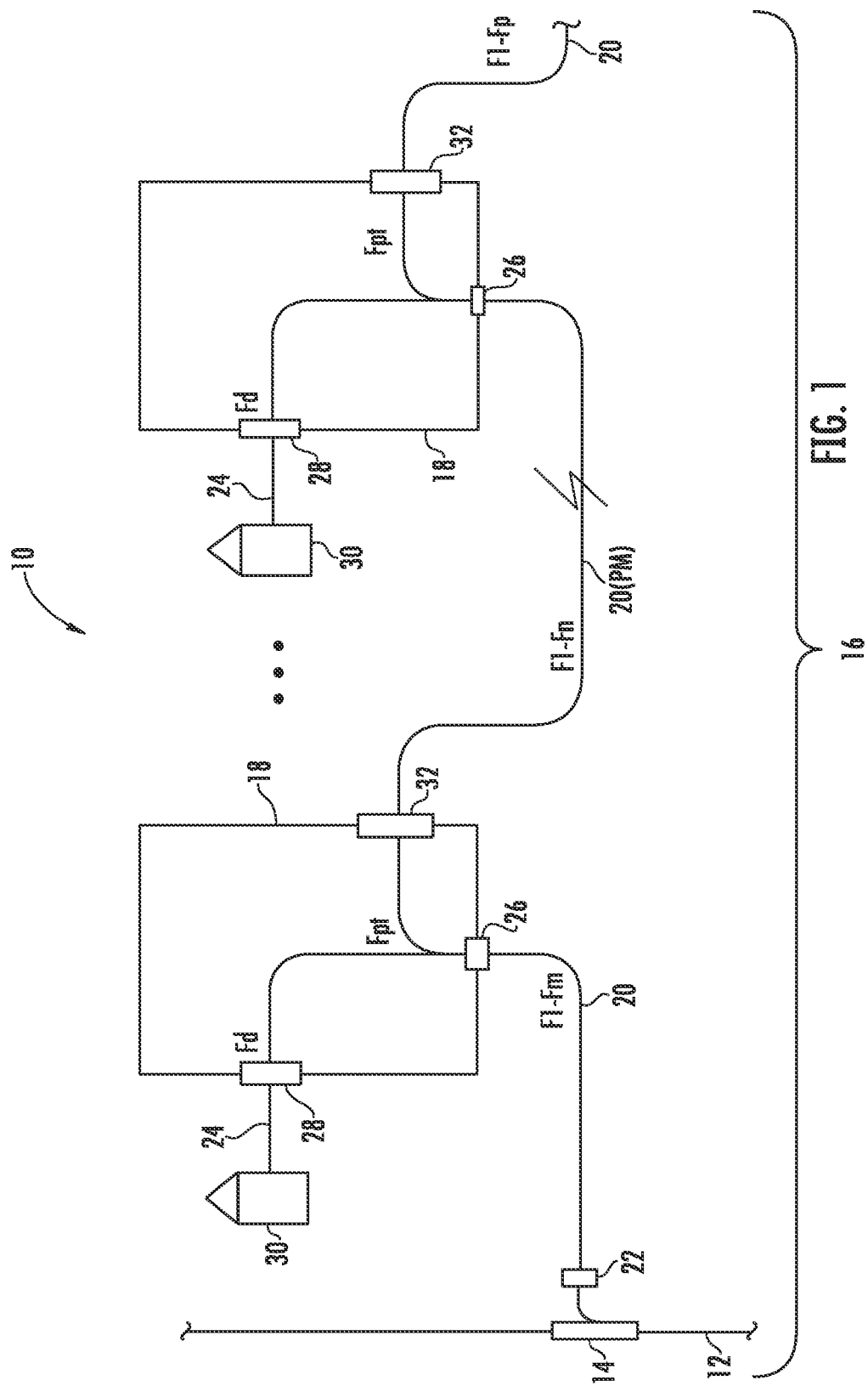

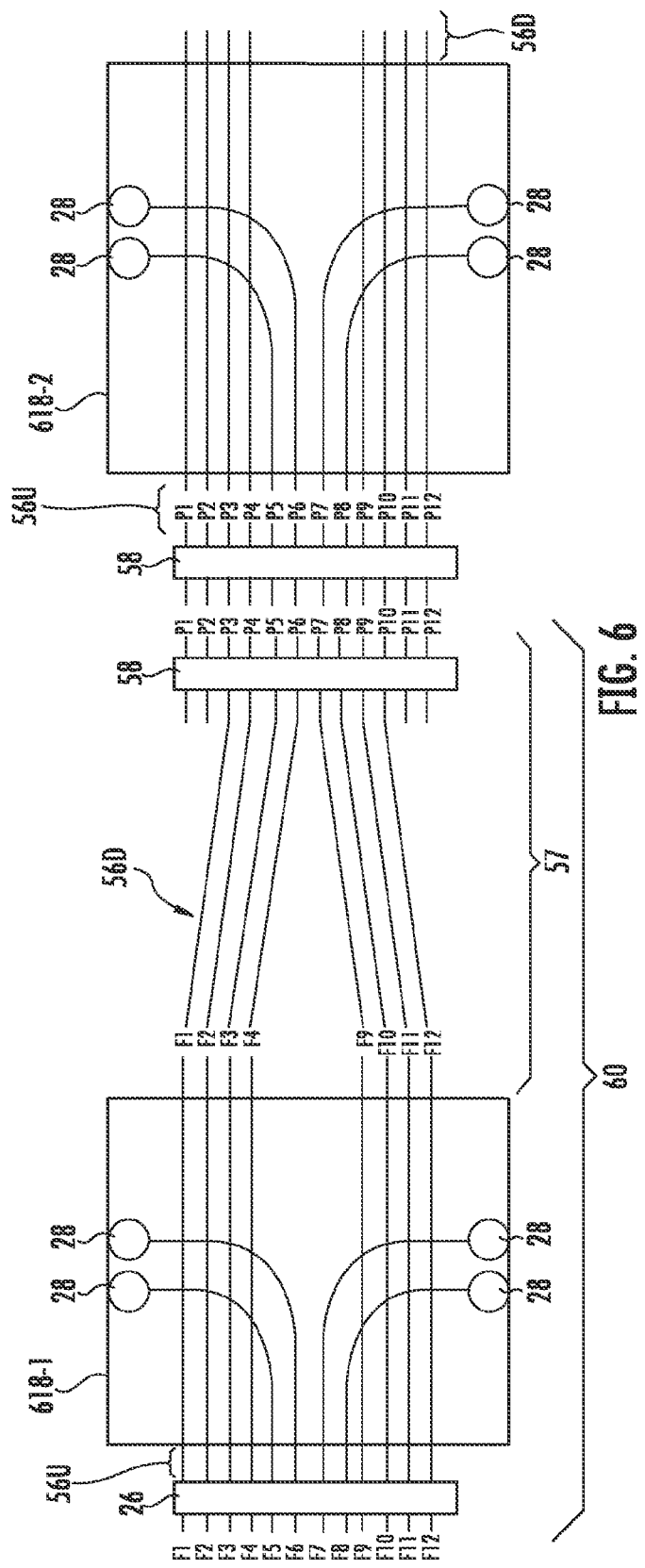

US 9,482,840 B2

PORT MAPPING FOR SERIES CONNECTED FIBER OPTIC TERMINALS

RELATED APPLICATIONS

The present application is related to co-pending U.S. patent application Ser. No. 12/323,385, filed on Nov. 25, 2008, entitled "OPTICAL CONNECTION TERMINAL HAVING PORT MAPPING SCHEME," which is incorporated herein by reference in its entirety.

This application is also related to co-pending U.S. patent application Ser. No. 12/323,395, filed on Nov. 25, 2008, entitled "FIBER OPTIC NETWORK ARCHITECTURE HAVING OPTICAL CONNECTION TERMINALS IN SERIES ARRANGEMENT," which is incorporated herein by reference in its entirety.

This application is also related to co-pending U.S. patent application Ser. No. 12/323,356, filed on Nov. 25, 2008, entitled "MULTI-LEVEL DISTRIBUTED FIBER OPTIC ARCHITECTURES" which is incorporated herein by reference in its entirety.

This application is also related to co-pending U.S. patent application Ser. No. 12/323,373, filed on Nov. 25, 2008, entitled "OPTICAL FIBER MANAGEMENT SHELF FOR OPTICAL CONNECTION TERMINALS," which is incorporated herein by reference in its entirety.

BACKGROUND

1. Field of the Disclosure

The technology of the disclosure relates generally to fiber optic network devices, and more particularly to connection of fiber optic terminals to a fiber optic network.

2. Technical Background

Optical fiber is increasingly being used for a variety of broadband applications including voice, video and data transmissions. As a result of the ever-increasing demand for broadband communications, telecommunication and cable media service providers and/or operators are expanding their fiber optic networks to increase their networks' capacity and reach to provide more services, applications and information to more proximate and distant subscribers. To facilitate this capacity and reach, the fiber optic networks employ additional fiber optic cable, hardware and components resulting in increased installation time, cost and maintenance. This can result in the fiber optic networks becoming more complex, requiring architectures that allow for the most efficient delivery of fiber optic service to the subscriber. These architectures typically employ fiber optic network devices, such as fiber optical terminals, for example, in branches of the fiber optic network. The fiber optic network devices act to optically interconnect the fiber optic cables of the branch, separate or combine optical fibers in multi-fiber cables, and/or split or couple optical signals, as may be necessary.

For example, a multi-fiber feeder cable from a central office or a transport cable from a head end may connect to multiple multi-fiber distribution cables. Each distribution cable then may extend to a designated geographic area, thereby providing the optical service to subscribers in that area. A fiber optic drop cable from the subscriber premises may connect to the distribution cable to establish optical connectivity between the service provider and the subscriber in a fiber to the premises (FTTP) optical network. However, extending the drop cable from the subscriber premises all the way to the distribution cable may require a substantial length of drop cable resulting in extensive cost and installation time. Moreover, the cost and installation time would be increased and compounded if a separate connection to the distribution cable was needed for each drop cable.

To reduce attendant cost and timing, one or more intermediate optical connection points between the distribution cable and the drop cable may be incorporated. To incorporate the intermediate optical connection points, a branch of the fiber optic network off of the distribution cable is established. The branch may be established at a branching point on the distribution cable, such as at a mid-span access location. In situations where there are many subscriber premises to be served by one mid-span access location, more than one fiber optic terminal in the branch from that one mid-span access location may be needed. This is particularly applicable where the subscriber premises are separated by appreciable distances, for example in rural areas. In such case, given the above-mentioned configuration of the fiber optic terminals and due to the dedicated branch (stub) cable, a separate branch with associated branch cables may have to be extended from the mid-span access location to each fiber optic terminal. Similar to the drop cable situation, the cost of the branch cable is generally charged on a per foot installed basis. Accordingly, installing separate branch cables from one mid-span access location to each fiber optic terminal may be excessively costly and time consuming.

As such, the current configurations of the fiber optic terminal and connecting cable assemblies between the fiber optic terminals may prohibit the feasibility of designing and using effective distributive hierarchical branching architectures as the FTTP optical network extends toward the subscriber premises.

SUMMARY OF THE DETAILED DESCRIPTION

Embodiments disclosed in the detailed description include port-mapped fiber optic cable assemblies that support connecting fiber optic terminals in series. As a result, each fiber optic terminal does not have to support a branch cable or distribution cable to be connected to a fiber optic network. A fiber optic terminal can be connected to a fiber optic network by connecting in series to another network connected fiber optic terminal(s) via a port-mapped fiber optic cable assembly.

In one embodiment, a port-mapped fiber optic cable assembly is provided for connecting fiber optic terminals in series. The fiber optic cable assembly includes a fiber optic cable having a plurality of optical fibers disposed therein between a first end and a second end of the fiber optic cable. A fiber optic connector terminates the plurality of optical fibers on the first end of the fiber optic cable according to a first optical fiber mapping. The plurality of optical fibers is disposed on the second end of the fiber optic cable according to a second optical fiber mapping. In this regard, the fiber optic cable assembly provides port mapping of optical fibers to allow multiple fiber optic terminals having the same internal optical fiber mapping to be connected in series in any order, while providing the same connectivity to each of the fiber optic terminals in the series.

Other embodiments provide fiber optic terminals that support port mapping for series connected fiber optic terminals. In one embodiment, the fiber optic terminal comprises a housing and a first plurality of optical ports in the housing. The first plurality of optical ports are connected to a plurality of optical fibers in a distribution cable extending inside the housing. A fiber optic cable having a plurality of optical fibers disposed therein between a first end of the fiber optic cable according to a first optical fiber mapping and a second end of the fiber optic cable according to a second optical fiber mapping is provided. The plurality of optical fibers on the first end of the fiber optic cable are connected to the first plurality of optical ports. The plurality of optical fibers on the second end of the fiber optic cable can be connected to the plurality of second optical ports in the housing. In this regard, the number of fiber optic cables used to connect terminals placed in series along a cable span or link can be reduced, thereby minimizing total footage placement costs. The first and/or second ends of the fiber optic cable may be pre-connectorized with a fiber optic connector or stubbed.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 1 is a schematic diagram of a portion of an exemplary fiber optic network, which includes two fiber optic terminals connected in series, wherein port mapping is provided in the fiber optic cable connecting the fiber optic terminals;

FIG. 6 is a schematic diagram of two identically configured fiber optic terminals connected in series based on an exemplary port mapping scheme utilizing a downstream cable stub and an upstream cable stub.

DETAILED DESCRIPTION

Figure 2A:
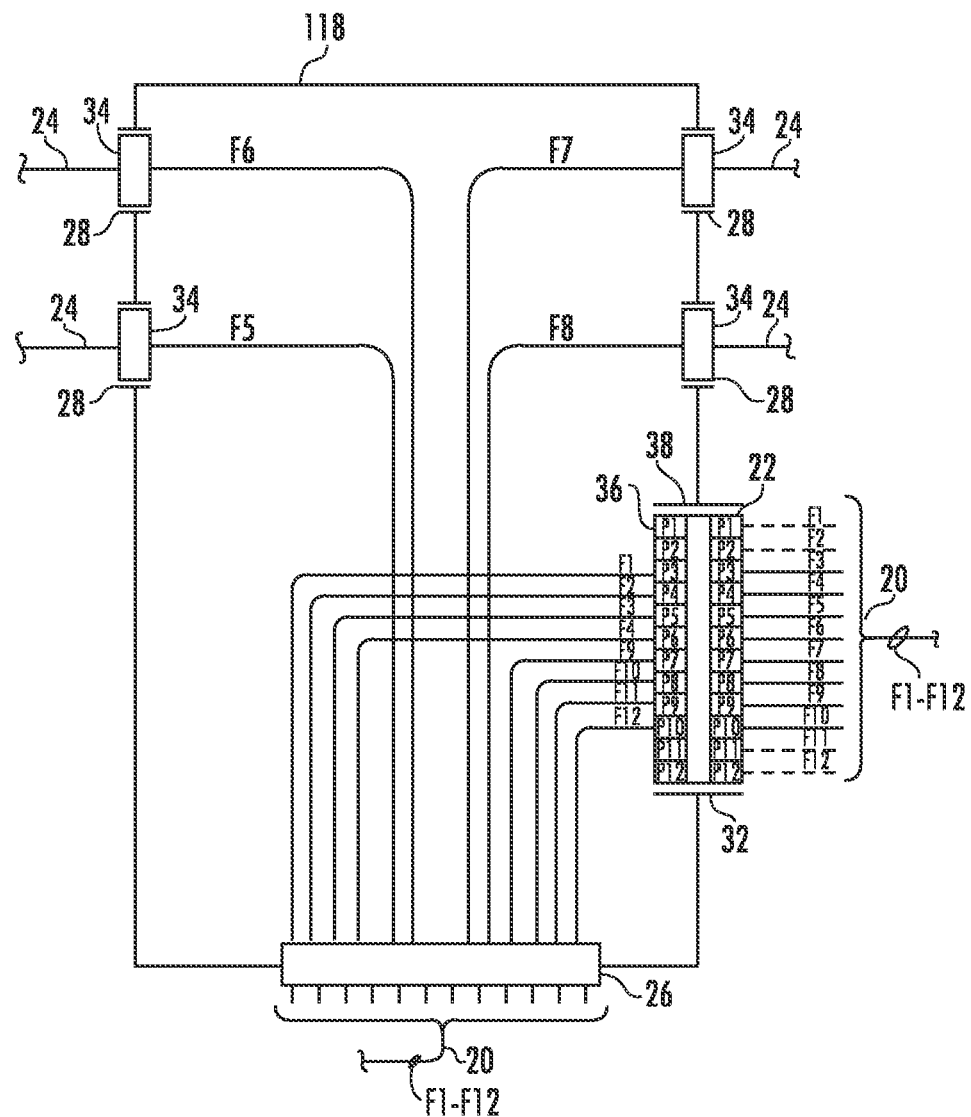
FIG. 2A is a schematic diagram of an exemplary fiber optic terminal including drop ports and a pass-through port operable for optically connecting predetermined ones of a plurality of optical fibers each to a drop cable.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include port-mapped fiber optic cable assemblies that support connecting fiber optic terminals in series. As a result, each fiber optic terminal does not have to support a branch cable or distribution cable to be connected to a fiber optic network. A fiber optic terminal can be connected to a fiber optic network by connecting in series to another network connected fiber optic terminal(s) via a port-mapped fiber optic cable assembly.

Referring now to FIG. 1, an exemplary embodiment of fiber optic terminals in a fiber optic network 10 that are connected together in series via a port-mapped fiber optic cable is schematically illustrated. The fiber optic network 10 comprises a fiber optic distribution cable 12, a mid-span access location 14, and multiple fiber optic terminals 18, only two of which are shown. Any number of fiber optic terminals 18 may be connected in series. The fiber optic terminals 18 may be at any point in the fiber optic network 10, near to or distant from the central office or head end. The mid-span access location 14 provides a branch point for branch 16. A branch cable 20 is shown connected to the distribution cable 12 through network connector 22 and extending to the fiber optic terminals 18 through branch cable opening 26. The branch cable 20 is received by the fiber optic terminal 18. As will be described herein, the branch cable 20 includes a port-mapping scheme that allows the fiber optic terminals 18 to be connected in series and optical fibers contained therein properly mapped to the optical fibers in the fiber optic distribution cable 12. A drop cable 24 extends from the fiber optic terminal 18 to subscriber premises 30. In this manner, the branch cable 20 provides optical communication between the distribution cable 12 and the subscriber premises 30 through the fiber optic terminals 18.

The branch cable 20 is shown in segments with each segment of the branch cable 20 comprising optical fibers designated by the letter "F." A segment of the branch cable 20 is shown extending from the distribution cable 12 at the mid-span access location 14 to one of the fiber optic terminals 18, while another segment of the branch cable 20 is shown extending from one of the fiber optic terminals 18 to another one of the fiber optic terminals 18. The segment of the branch cable 20 extending from the distribution cable 12 comprises optical fibers F1-Fm. The segment of the branch cable 20 that extends from one of the fiber optic terminals 18 to another one of the fiber optic terminals 18 comprises optical fibers F1-Fn and F1-Fp, respectively. The designation of "m," "n" and "p" indicates the number of optical fibers in that segment of the branch cable 20. In this exemplary embodiment, m, n and p may be equal, indicating that the number of fibers is the same in each segment of the branch cable 20, or, alternatively, one or more of m, n and p may be different, indicating that one or more of the segments of the branch cable 20 may comprise a different number of optical fibers than another segment of the branch cable 20. Additionally or alternatively, one or more of m, n and p may equal 1.

In FIG. 1, the fiber optic terminals 18 may each be configured with a port mapping scheme to facilitate serial connection between the two fiber optic terminals 18 as illustrated. The port mapping scheme predetermines the routing and optical connecting of the optical fibers in the branch cable 20 via a drop port 28 and/or via a pass-through port 32, and/or via a component, and/or via a connector (not shown), and/or the like in one or both of the fiber optic terminals 18. In this embodiment, optical fibers F1-Fm of the segment of branch cable 20 enter the first fiber optic terminal 18 via the branch cable opening 26. At least one of the optical fibers F1-Fm, designated as Fd, routes to at least one drop port 28 based on a port mapping scheme PM. Additionally or alternatively, at least one of the optical fibers F1-Fm, designated as Fpt, routes to the pass-through port 32 also based on the port mapping scheme PM. The optical fiber designated as Fpt may or may not be and/or include the optical fiber designated as Fd depending on the port mapping scheme.

Embodiments herein will describe various port mapping schemes that can be provided. In one embodiment, a port mapping scheme may be implemented in one or more of the fiber optic terminals 18. In another embodiment, the port mapping scheme is implemented in a fiber optic cable assembly, such as the branch cable 20, as indicated by the PM designation on the branch cable 20 in FIG. 1. This can permit more economical installation of the fiber optic terminals 18 by minimizing the number of cables used to connect the fiber optic terminals 18 placed in series along the branch 16 or other cable span or link, thereby minimizing total footage placement costs. The time and cost of repairs is also minimized by minimizing the number of cables and/or by allowing the fiber optic terminal 18 assembly to be replaced with no splicing required. In addition, because one universal fiber optic terminal 18 may be used at any point in the series, complexity and installation skill are minimized and component inventories can be minimized and simplified. Other fiber optic cables may also be used to implement a port mapping scheme according to various embodiments.

Returning to FIG. 1, a segment of the branch cable 20 comprising optical fibers designated as F1-Fn extends from the first fiber optic terminal 18 to the second fiber optic terminal 18. The pass-through port 32 is operable for optically connecting the optical fiber Fpt to one of the optical fibers F1-Fn in the segment of the branch cable 20 that extends from the first fiber optic terminal 18. The optical fibers F1-Fn of the segment of the branch cable 20 enter the second fiber optic terminal 18 via the branch cable opening 26. Similar to the first fiber optic terminal 18, in the second fiber optic terminal 18 the optical fiber designated as Fd, of optical fibers F1-Fn, routes to the drop port 28 based on a port mapping scheme. Also similar to the first fiber optic terminal 18, the optical fiber Fpt of the optical fibers F1-Fn routes to the pass-through port 32 based on a port mapping scheme. The optical fiber Fpt may or may not be or include Fd depending on the port mapping scheme. Whether optical fibers designated as Fd optically connect with the first drop cable 24 via the drop port 28 in the first fiber optic terminal 18 and/or optically connect with the second drop cable 24 via the drop port 28 in the second fiber optic terminal 18 is predetermined based on the desired port mapping scheme.

Although not shown in FIG. 1, a multi-fiber connector may be used to connect the segment of the branch cable 20 extending from the first fiber optic terminal 18 to the pass-through port 32 of the first fiber optic terminal 18. In such case, the manner in which the optical fiber Fpt connects to the connector may be in a pre-determined alignment to result in the desired port mapping scheme. Additionally, a multi-fiber connector and/or a splice, such as a fusion splice, may be used to connect the segment of the branch cable 20 to a fiber optic terminal 18 in, through and/or instead of the branch cable opening 26.

Although not shown in FIG. 1, the fiber optic terminal 18 may include other optical components, including but not limited to a splitter, splice protector, WDM device, splice holder and tray, routing guide and slack storage. The port mapping scheme may predetermine the configuring of the fiber optic terminal with one or more of these other optical components, and/or the routing of optical fibers to and optically connecting of optical fibers with one or more of the components. As an example, an optical fiber from the branch cable 20 may optically connect to a splitter. The optical signal carried by that optical fiber may be split into multiple optical signals by the splitter. Optical fibers carrying the optical signals may optically connect to a drop cable via one or more of the drop connector ports and/or pass-through connector ports. The optical fiber Fd may output from the splitter and route to the drop port 28 in the fiber optic terminal 18.

FIG. 2A depicts an exemplary internal mapping scheme to facilitate breakout of optical fibers entering a fiber optic terminal 118 from the branch cable 20, which enables the fiber optical terminal 118 to be connected in series to another fiber optic terminal. The fiber optic terminal 118 is similar to the fiber optic terminal 18 of FIG. 1, but is depicted as element 118 in FIG. 2A to illustrate an exemplary internal mapping scheme. The branch cable 20 enters the fiber optic terminal 118 through the branch cable opening 26. In this embodiment, the fiber optic terminal 118 comprises four drop ports 28 and one pass-through port 32. The branch cable 20 comprises twelve optical fibers, which are shown designated as F1-F12. The port mapping scheme utilized with the fiber optic terminal 118 depicted in FIG. 2A uses the middle four optical fibers of the twelve optical fibers of branch cable 20. In this respect, the middle four optical fibers, designated F5, F6, F7, and F8, route to the drop ports 28 and optically connect to the drop cables 24 via the drop ports 28. The optical fibers F5-F8 may be connectorized and connect to adapters 34 seated in the drop ports 28. The drop cables 24 may be pre-connectorized and connect to the optical fibers F5-F8 through the adapter 34.

The optical fibers on either side of the middle four optical fibers, being optical fibers F1, F2, F3, F4, F9, F10, F11, and F12, may be routed to the pass-through port 32. In FIG. 2A, a pass-through connector 36 seats in the pass-through port 32 and connects to a multi-fiber adapter 38. Alternatively, a splice, such as a fusion splice, may be used instead of a pass-through connector 36. The optical fibers F1, F2, F3, F4, F9, F10, F11, and F12 connect to the pass-through connector 36 at connection ports P3, P4, P5, P6, P7, P8, P9, and P10, respectively. Thus, the connection ports P1, P2, P11, and P12 on the pass-through connector 36 do not have an optical fiber connected to them, and, therefore, no optical signal passes through those connection ports. The branch cable 20 that extends from one fiber optic terminal 118 to another also has twelve optical fibers, and connects to the multi-fiber adapter 38 through a network connector 22. The connection ports of the pass-through connector 36 align with the same connection ports of the network connector 22. Thus, the connection ports P1-P12 of the pass-through connector 36 align with and are optically connected to the connection ports P1-P12 of the network connector 22. Because of this alignment, no optical signals pass through the connection ports P1, P2, P11, and P12 of the pass-through connector 36, and, accordingly, no optical signal is passed to the optical fibers F1, F2, F11, and F12 of the segment of the branch cable 20 routed between the fiber optic terminals 118. This is shown in FIG. 2A by the dotted lines for the optical fibers F1, F2, F11 and F12.

Figure 2B:
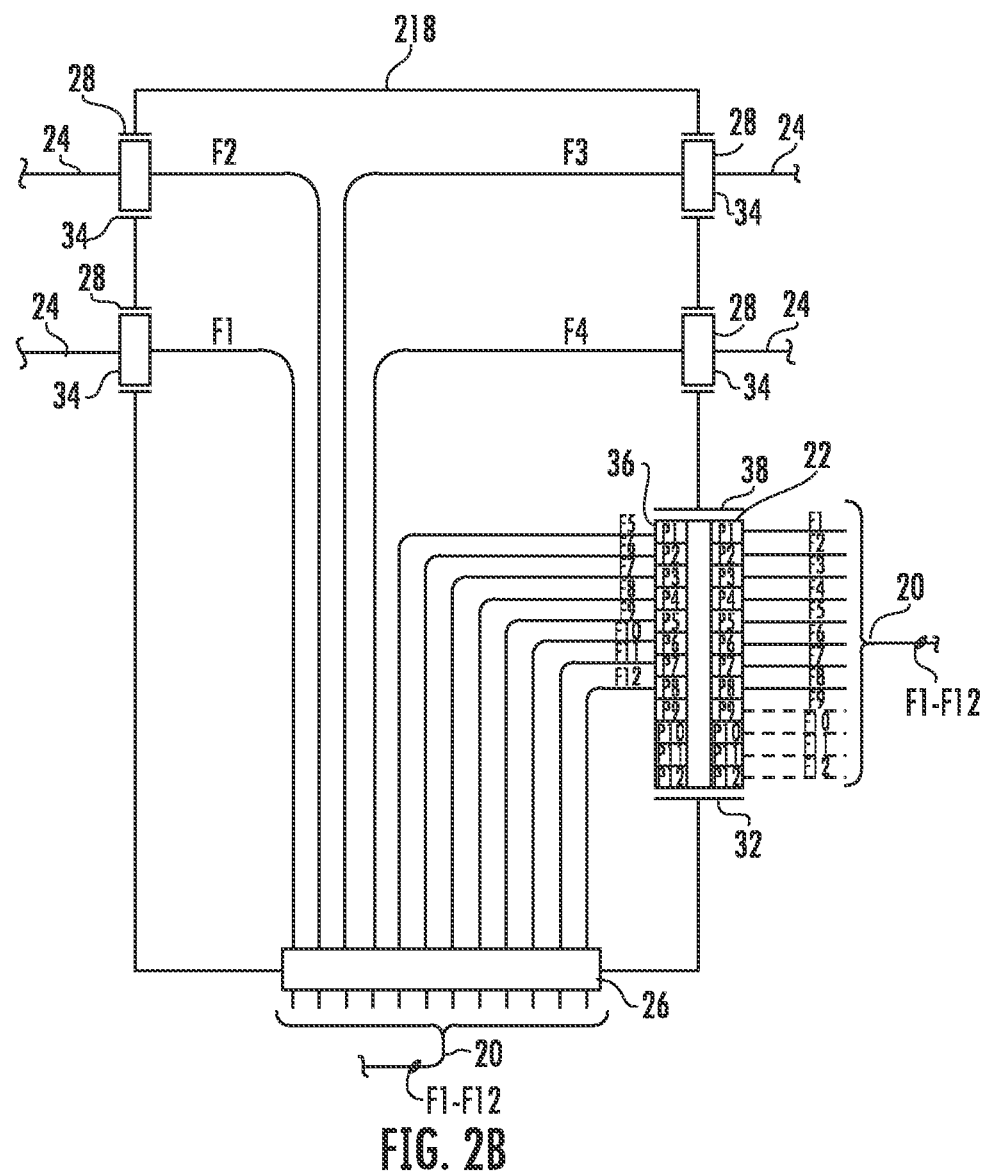
FIG. 2B is a schematic diagram of an exemplary fiber optic terminal including drop ports and a pass-through port operable for optically connecting alternative predetermined ones of a plurality of optical fibers each to a drop cable.

FIG. 2B illustrates another exemplary embodiment of a port mapping scheme in a fiber optic terminal 218 similar to FIG. 2A, but with different optical fibers optically connected via the drop ports 28 and the pass-through port 32. In FIG. 2B, the optical fibers designated as F1, F2, F3, and F4 of the branch cable 20 route to the drop ports 28 and optically connect to the drop cables 24 via the drop ports 28 and the adapters 34 seated in the drop ports 28. The optical fibers designated F5-F12 route to the pass-through port 32 and connect to the ports P1-P8, respectively, of the pass-through connector 36 seated in the multi-fiber adapter 38 in the pass-through port 32. Because of the port alignment of the pass-through connector 36 and the network connector 22, the optical fibers F5-F12 also optically connect to the connector ports P1-P8 of the network connector 22. The optical fibers designated as F1-F8 of the branch cable 20 extending between fiber optic terminals 218 connect to the connector ports P1-P8 on the network connector 22 and, therefore, carry optical signals, while the optical fibers F9-F12 may not carry any optical signals. This is illustrated in FIG. 2B by the dotted lines for the optical fibers F9-F12.

In the embodiments shown in FIGS. 2A and 2B, eight optical fibers of the branch cable 20 are connected to a twelve port pass-through connector 36. The pass-through connector 36 connects to a multi-fiber adapter 38 seated in the pass-through connector port 32. A segment of the branch cable 20 that extends to another fiber optic terminal connects to the multi-fiber adapter 38 through a network connector 22 external to the fiber optic terminals 118, 218. As described above, the network connector 22 may be any type of multi-fiber connector, such as an OptiTip® fiber optic connector manufactured by Corning Cable Systems, LLC of Hickory, N.C., the assignee of the present application. Thus, the multi-fiber adapter 38 may be an MTP/OptiTip adapter to accept and connect the pass-through connector 36, an MTP connector, and the network connector 22, an OptiTip connector. In this manner, the fiber optic terminals 118, 218 may be series and/or sub-branch connected with another fiber optic terminal 18, as depicted in FIG. 1.

As discussed above with reference to FIGS. 2A and 2B, the port mapping scheme may be embodied in the fiber optic terminals 118, 218. In this case, the port mapping scheme predetermines the routing and optical connecting of the optical fibers of the branch cable 20 to establish the optical communication between the distribution cable 12 and the subscriber premises 30. In particular, the port mapping scheme may predetermine which optical fibers optically connect to drop cables 24 via drop ports 28, and which optical fibers optically connect to drop cables 24 via pass-through ports 32 in each fiber optic terminal 18 in the branch 16. Additionally, a multi-fiber connector may be seated in the pass-through port 32, in which case the port mapping scheme may determine to which port of the connector the optical fibers Fpt may be optically connected.

Figure 2C:
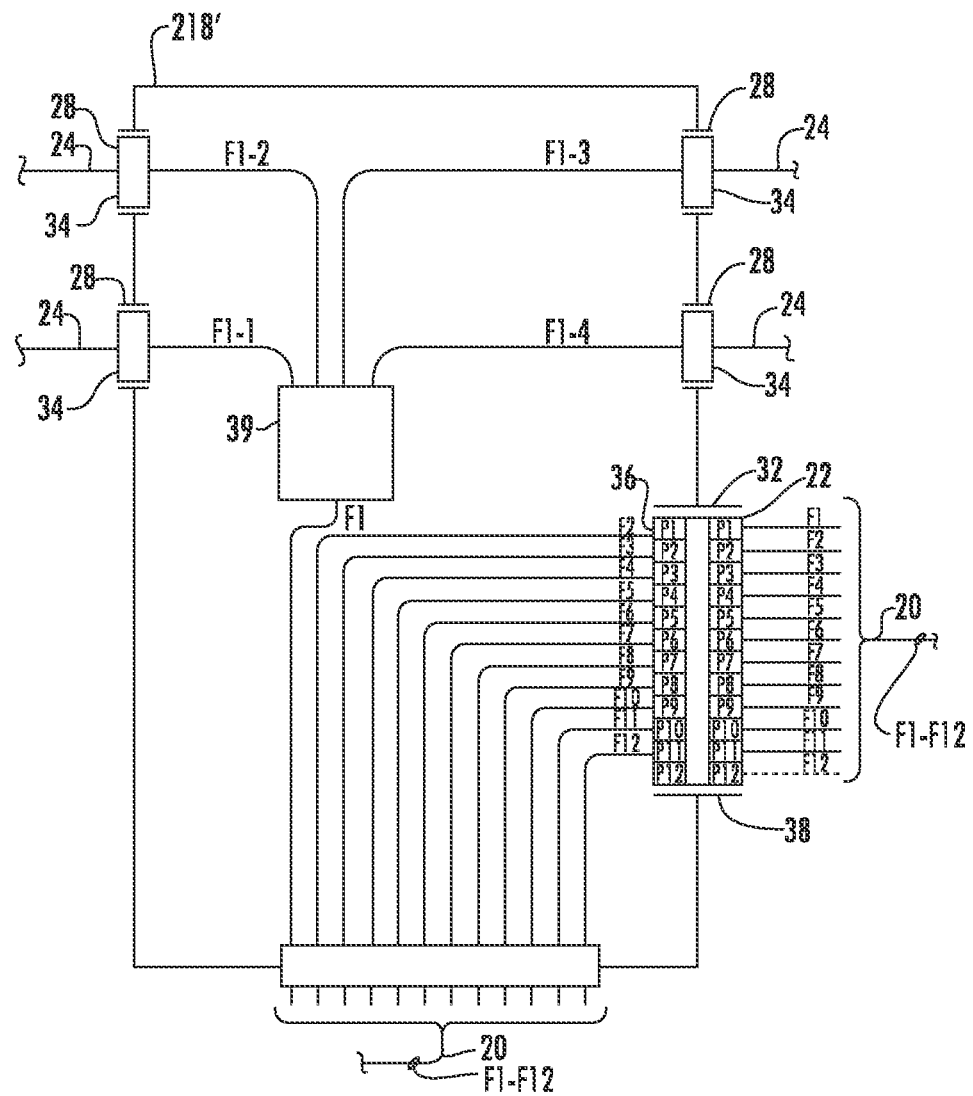
FIG. 2C is a schematic diagram of an exemplary fiber optic terminal including a splitter, drop ports, and a pass-through port.

Other exemplary embodiments of fiber optic terminals may be configured with splitters with the port mapping schemes. FIG. 2C illustrates an exemplary embodiment of such a fiber optic terminal. In FIG. 2C, the fiber optic terminal 218' is similar to the fiber optic terminals 118 and 218 depicted in FIGS. 2A and 2B, and, therefore, like components will not be discussed again with reference to FIG. 2C. In the exemplary embodiment illustrated in FIG. 2C, the fiber optic terminal 218' includes a splitter 39. Although only one splitter 39 is shown in this embodiment, it should be understood that multiple splitters 39 may be included.

In this embodiment, the splitter 39 is a 1×4 splitter although any other type of splitter could be provided including but not limited to a 1×12 splitter as an example. One optical fiber, indicated in FIG. 2C as F1 from the branch cable 20, optically couples to the splitter 39. The other optical fibers of the branch cable 20, being the optical fibers F2 through F12, are routed to the pass-through connector 36. Four first split optical fibers indicated in FIG. 2C as F1-1, F1-2, F1-3, and F1-4 output from the splitter 39. Each of the first split optical fibers that output from the splitter 39 may be pre-connectorized and routed to a drop port 28 and optically coupled to a drop cable via the drop port 28 and the adapter 34 seated in the drop port 28.

The optical fibers designated as F2 through F12 route to the pass-through port 32 and optically couple with the connection ports P1 through P11, respectively, of the pass-through connector 36. Thus, the connection port P12 of the pass-through connector 36 does not connect to an optical fiber. Therefore, no optical signal will pass through the connection port P12 of pass-through connector 36. Because no optical fibers connect to the connection port P12 of the pass-through connector 36, there is no optical signal on the connection port P12 of the network connector 22 and, thus no optical signal optically couples to the optical fiber F12 of the segment of the branch cable 20 which extends to the other fiber optic terminals 218'. In FIG. 2C this is shown by the dotted lines for the optical fiber F12.

Figure 3:
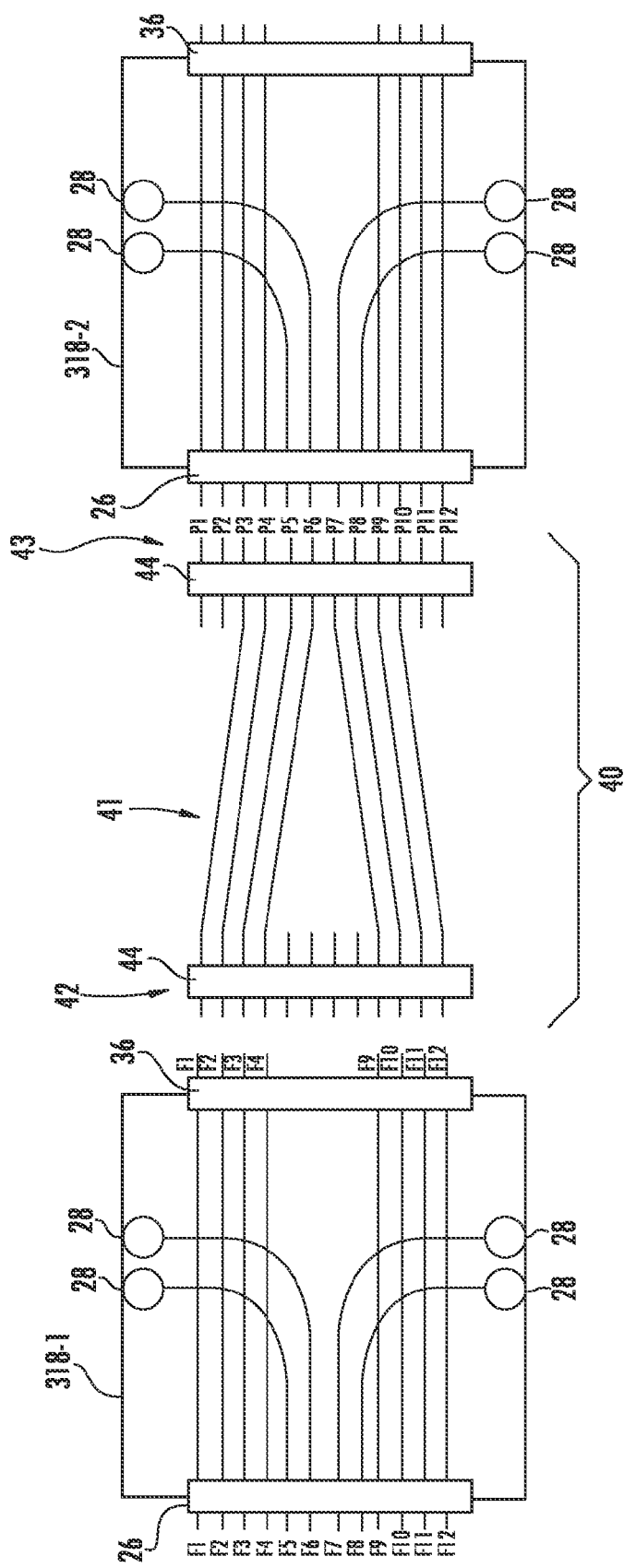
FIG. 3 is a schematic diagram of an exemplary fiber optic cable assembly connecting two fiber optic terminals in series based on an exemplary port mapping scheme.

Now turning to FIG. 3, an embodiment is shown in which the port mapping scheme is embodied in a fiber optic cable assembly connecting fiber optic terminals in lieu of providing the port mapping within the fiber optic terminals. Providing port mapping in a fiber optic cable assembly can avoid having to provide the port mapping scheme in fiber optic terminals and allows multiple fiber optic terminals having the same internal fiber mapping to be connected in series, in any order, while providing the same connectivity to each of the fiber optic terminals in the series. By providing one universal fiber optic terminal that can be used at any point in the series, installation may be easier and component inventories kept on hand may be minimized and simplified. In addition, in the case of necessary repairs, the fiber optic terminal assembly can be replaced as a unit simply without complex equipment or skill sets or additional hardware.

As illustrated in FIG. 3, two fiber optic terminals 318-1 and 318-2 are connected by a fiber optic cable assembly 40, which includes a fiber optic cable 41. The fiber optic cable 41 may have a plurality of optical fibers disposed therein between a first end 42 and a second end 43 of the fiber optic cable 41. The fiber optic cable assembly 40 may have a fiber optic connector 44 terminating the plurality of optical fibers on the first end 42 of the fiber optic cable 41 according to a first mapping scheme. The plurality of optical fibers are disposed on the second end 43 of the fiber optic cable 41 according to a second mapping scheme. There may be one or more fiber optic connectors 44 on the second end 43 of the fiber optic cable assembly 40.

As shown in FIG. 3, the fiber optic terminals 318-1 and 318-2 are configured identically to each other, and may be of the type described above with respect to FIGS. 2A and 2B. The fiber mapping inside the fiber optic terminal 318-1 assigns fibers F5-F8 to the ports in the fiber optic terminal 318-1 in the same fashion described above with respect to FIG. 2A. However, in the embodiment shown in FIG. 3, instead of a standard connecting cable assembly between the serially connected fiber optic terminals shown in FIG. 1 and 2A, where fibers F1-F12 are mapped to the same positions on both the first and second ends 42, 43 of the fiber optic cable 41, the fiber optic cable assembly 40 connecting the fiber optic terminal 318-1 outbound to the fiber optic terminal 318-2 inbound has been modified so that the fibers F1-F4 and F9-F12 on the input side (fiber optic terminal 318-1 outbound) map to positions P3-P6 and P7-P10 in the outbound fiber optic connector 44 (fiber optic terminal 318-2 inbound) respectively. Thus, in the embodiment of FIG. 3, the fiber mapping in the fiber optic terminal 318-1 has fibers F5-F8 assigned to the four drop ports 28 in the fiber optic terminal 318-1 while fibers F1-F4 and F9-F12 on the input side map to the same positions, P1-P4 and P9-P12, respectively, in the outbound fiber optic connector 44. In FIG. 3, the port mapping is done in the fiber optic cable assembly 40 linking the fiber optic terminals 318-1 and 318-2 instead of being done within the fiber optic terminals 318-1 and 318-2. In this manner, specific fiber mapping within the connecting fiber optic cable assembly 40 may be used to allow multiple fiber optic terminals having the same internal mapping to be connected in series, in any order, while providing the same connectivity to each of the fiber optic terminals in the series.

In the embodiment shown in FIG. 3, multiple fiber optic terminals of the same configuration may be connected in series without preference to the order of connection, while passing light from an originating end through to each port on each fiber optic terminal. The fiber optic cable 41 of the fiber optic cable assembly 40 in FIG. 3 may be preconnectorized on both the first and second ends 42, 43. However, in other embodiments, one or more of the fiber optic terminals may have a cable stub and a multi-fiber connector on the end of the cable stub, as discussed more fully with respect to FIGS. 4-6. The fibers used to connect the fiber optic terminal 318-1 in the embodiment of FIG. 3, where the fiber optic terminal 318-1 has four drop ports 28, are the center four positions (P5-P8) of a twelve fiber ferrule.

In another embodiment, the fiber optic terminal 318-1 may be a six port terminal, where the six center positions (P4-P9) are used, and so on. In the embodiment of FIG. 3, a twelve fiber cable stub with a multi-fiber connector (not shown) is used to feed the fiber optic terminal 318-1. The center four fibers (F5-F8) are routed to connectors constituting the drop ports 28 for that fiber optic terminal. The remaining fibers (F1-F4 and F9-F12) are routed to positions P3-P10 on a downstream fiber optic connector 44, to which the originating end of the fiber optic terminal 318-2 may be connected via a branch cable opening 26. The original fiber order (F1, F2, F3, F4, F9, F10, F11, and F12) is mapped into positions P3, P4, P5, P6, P7, P8, P9, and P10, respectively. In this way, fibers F5-F8 are patched through (back toward the head end) to optical fibers that form a continuous path to the originating end of the first fiber optic terminal in the series (fiber optic terminal 318-1 in FIG. 3). Thus, positions P5-P8 on the fiber optic terminal 318-2's originating end feed the drop ports 28 on the fiber optic terminal 318-2.

If a third fiber optic terminal (not shown) is connected to the series, the pattern repeats and the center four fibers F5-F8 are patched all the way back to P1-P2 and P11-P12 on fiber optic terminal 318-2's originating end. Because the remaining optical fibers at each fiber optic terminal (the ones that do not serve the drop ports on that fiber optic terminal) are collapsed toward the center of the ferrule, the fiber optic terminals in the series may be identically configured and connected in any order and still create complete optical pathways between the first fiber optic terminal's originating end and each of the ports on each of the other fiber optic terminals in the series. The mapping of the optical fibers in the ferrule on the first fiber optic terminal's originating end will always be consistent for a given set of port counts and the number of fiber optic terminals in the series.

In addition, because the optical fiber positions in the multi-fiber connector ferrule follow the same pattern as standard fiber optic terminals, the last fiber optic terminal in the series can be a standard multiport fiber optic terminal of the appropriate fiber port count. For example, a four port fiber optic terminal can be the third fiber optic terminal in a series of three four port fiber optic terminals and a standard eight port fiber optic terminal can be connected to a series type multiport fiber optic terminal, thereby allowing for a four port fiber optic terminal to be followed by a eight port set up.

As noted, fiber optic terminals 318-1 and 318-2 are configured the same and the linking cables are configured the same, although the lengths of the linking cables may vary. However, the feeder cable to the first fiber optic terminal (fiber optic terminal 318-1) may be a standard cable, with the connecting fiber optic cable assembly 40 between the fiber optic terminals 318-1 and 318-2 providing the unique fiber mapping. Also note that although not shown in FIG. 3, there may be multiple fiber optic terminals connected in series with the fiber optic terminals 318-1 and 318-2, where each connecting fiber optic cable assembly 40 between the fiber optic terminals in the series provides the fiber mapping.

In addition, the port mapping done by the connecting fiber optic cable assembly 40 may be used with any mapping scheme within the fiber optic terminals 318-1, 318-2. For example, the port mapping in the connecting fiber optic cable assembly 40 may be used in conjunction with the mapping scheme within the fiber optic terminal as shown in FIG. 2B, where fibers F1-F4 are routed to the drop ports 28 and fibers F5-F12 are routed to the pass-through port 32 and connected to the ports P1-P8, respectively, of the pass-through connector 36. In that embodiment, fibers F5-F8 and F9-F12 would be mapped by the connecting fiber optic cable assembly 40 to positions P3-P6 and P7-P10 so that fibers F5-F8 and F9-F12 on the input side (fiber optic terminal 318-1 outbound) map to positions P3-P6 and P7-P10 in the outbound fiber optic connector 44 (fiber optic terminal 318-2 inbound) respectively.

Figure 4:
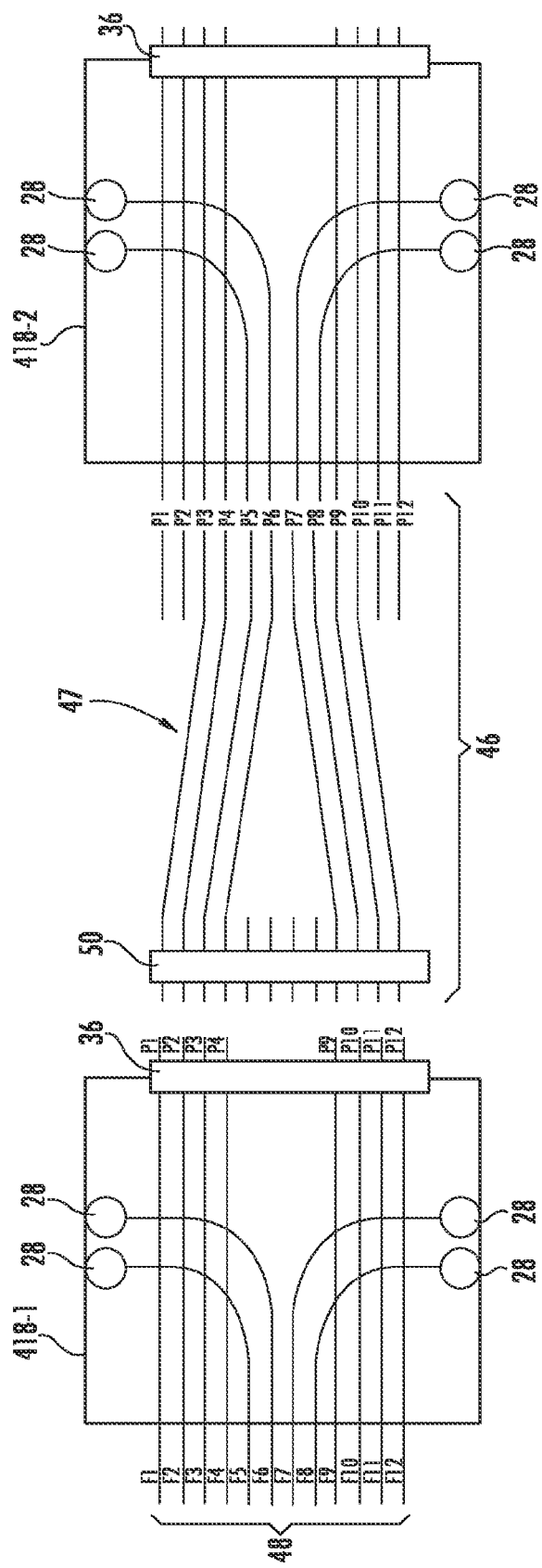
FIG. 4 is a schematic diagram of an exemplary cable stub connecting a fiber optic terminal in series with an upstream stubbed fiber optic terminal based on an exemplary port mapping scheme.

Turning now to FIG. 4, an embodiment in which a cable stub, as opposed to a pre-connectorized fiber optic cable, provides the port mapping is depicted. In one embodiment, one or more of the fiber optic terminals may have a cable stub and a multi-fiber connector on the end of the cable stub. Providing the port mapping scheme in the fiber optic terminal's cable stub configuration allows multiple fiber optic terminals having the same internal fiber mapping to be connected in series, in any order, while providing the same connectivity to each of the fiber optic terminals in the series. In FIG. 4, the port mapping scheme in the fiber optic terminal's cable stub configuration also allows for the fiber optic terminals to be serially connected to one another without regard to order or which fibers have been utilized upstream.

In FIG. 4, a fiber optic cable assembly 46 comprising a fiber optic cable stub 47 connects a fiber optic terminal 418-1 with an upstream stubbed fiber optic terminal 418-2. The connecting fiber optic cable stub 47 optically connects predetermined ones of a plurality of optical fibers from the first fiber optic terminal 418-1 to the upstream stubbed fiber optic terminal 418-2 based on an exemplary form of a port mapping scheme. In FIG. 4, two fiber optic terminals 418-1 and 418-2 are shown, although it is understood that additional fiber optic terminals could be connected in series to the fiber optic terminals 418-1 and 418-2. Fiber optic terminal 418-1 is a standard configuration fiber optic terminal where the twelve feeder fibers 48 entering on the far left side are spliced or connectorized to the twelve fiber feed from the head end. The fiber optic terminal 418-2 is not configured identically to the fiber optic terminal 418-1 and has an upstream fiber optic cable stub 47 that can be connected (plugged) into a pass-through connector 36 on the fiber optic terminal 418-1 or on an upstream fiber optic terminal connected to the fiber optic terminal 418-2 via a fiber optic connector 50 on one end of the upstream fiber optic cable stub 47. In the embodiment of FIG. 4, the fiber optic terminal 418-2 could be configured identically, or similarly, based on fiber drop counts, to any other upstream fiber optic terminals, but would be different from standard fiber optic terminal 418-1. The fiber mapping inside both fiber optic terminals 418-1, 418-2 assigns fibers F5-F8 to the drop ports 28 in the respective fiber optic terminals 418-1, 418-2. Optical fibers F1-F4 and F9-F12 on the input side are mapped via the fiber optic cable stub 47 to ports P3-P6 and P7-P10 in the fiber optic terminal 418-2, respectively. The upstream stubbed fiber optic terminal 418-2 is configured so that fibers F1-F4 and F9-F12 on the input connector map to positions P3-P6 and P7-P10 inside the fiber optic terminal 418-2 respectively to allow for serial connections with any upstream fiber optic terminals.

As discussed above with respect to the embodiment of FIG. 4, the port mapping provided by the fiber optic cable stub 47 may be used with any mapping scheme within the fiber optic terminals, including but not limited to the mapping schemes within the fiber optic terminals as shown in FIGS. 2A and 2B.

Figure 5:
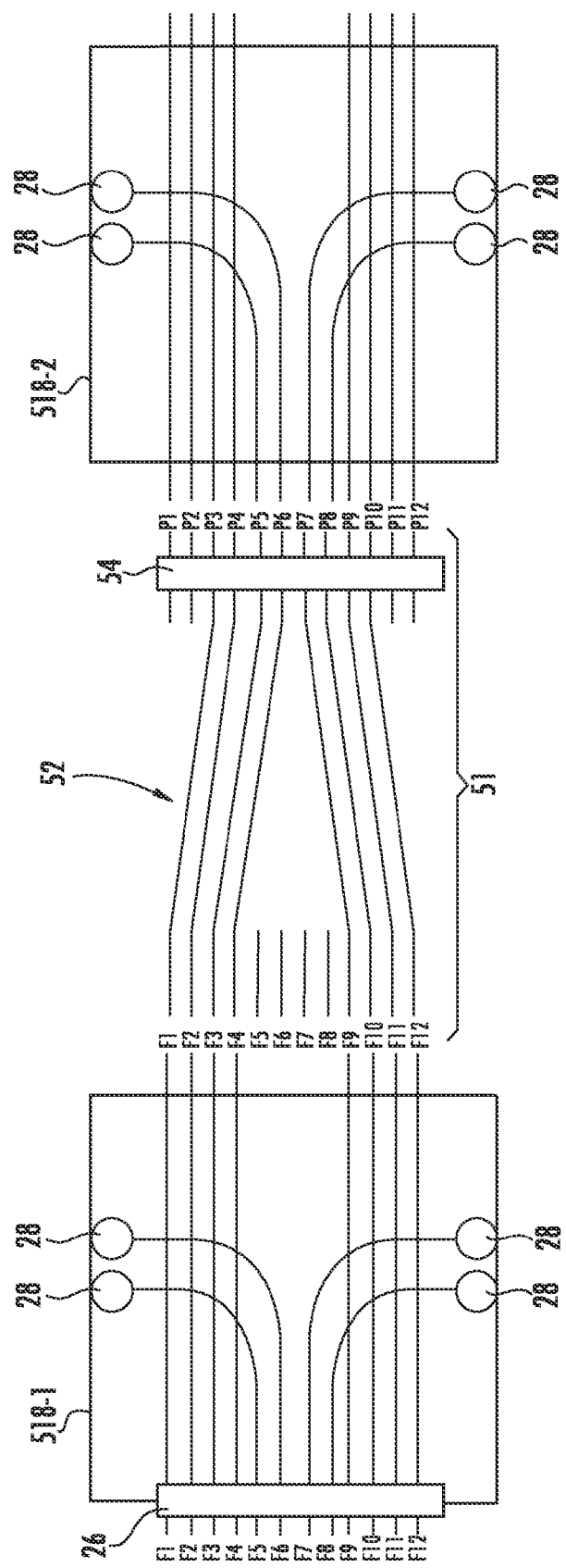
FIG. 5 is a schematic diagram of an exemplary cable stub connecting identically configured fiber optic terminals in series based on an exemplary port mapping scheme.

Turning to FIG. 5, another embodiment in which the port mapping is accomplished within the fiber optic terminal's cable stub configuration is depicted. One difference between the cable stub configuration of FIG. 5 as compared to the cable stub configuration of FIG. 4 is that the cable stub configuration of FIG. 5 is pre-connectorized with a fiber optic connector on the opposite end of the cable stub. Providing the port mapping scheme in the fiber optic terminal's cable stub configuration of FIG. 5 allows multiple fiber optic terminals having the same internal fiber mapping to be connected in series, in any order, while providing the same connectivity to each of the fiber optic terminals in the series. In FIG. 5, the port mapping scheme in the fiber optic terminal's cable stub configuration also allows for the fiber optic terminals to be identically configured from the first to the last fiber optic terminal in the series.

In the embodiment of FIG. 5, two fiber optic terminals 518-1 and 518-2 are shown, although it is understood that additional fiber optic terminals could be connected in series to the fiber optic terminals 518-1 and 518-2. The fiber optic terminals 518-1 and 518-2 are identically configured in the embodiment shown in FIG. 5. The input to fiber optic terminal 518-1 may be a conventional twelve fiber feeder cable that is connected (plugged) into branch cable opening 26. Each fiber optic terminal 518-1 and 518-2 has a downstream fiber optic cable assembly 51 comprised of a cable stub 52 that can be connected (plugged) into the input connector of the subsequent fiber optic terminal. The fiber mapping provided in both fiber optic terminals 518-1 and 518-2 assigns the same fibers to the drop ports 28 in the fiber optic terminal. In the embodiment of FIG. 5, it is fibers F5-F8 that are routed to the drop ports 28 and fibers F1-F4 and F9-F12 that are routed to the pass through connector. However, any fiber mapping scheme could be used within the fiber optic terminals, such as the one depicted in FIG. 2B, where fibers F1-F4 are routed to the drop ports 28 and fibers F5-F12 are routed to the pass-through port. In the embodiment of FIG. 5, the cable stub 52 maps fibers F1-F4 and F9-F12 on the input side to ports P3-P6 and P7-P10, respectively, in the outbound pass-through fiber optic connector 54. In this manner, each of the fiber optic terminals 518-1 and 518-2 (and any other upstream fiber optic terminals) are configured identically and serial connection of the fiber optic terminals is enabled.

As before, alternate fiber optic mapping schemes could be addressed with the appropriately mapped connecting cable stub 52 of FIG. 5.

Now, referring to FIG. 6, another embodiment in which the port mapping is accomplished within the fiber optic terminal's cable stub configuration is depicted with a double cable stub for port mapping. In the embodiment of FIG. 6, each of the fiber optic terminals may be configured with an upstream cable stub and a downstream cable stub. Providing the port mapping scheme in the fiber optic terminal's cable stub configuration of FIG. 6 allows multiple fiber optic terminals having the same internal fiber mapping to be connected in series, in any order, while providing the same connectivity to each of the fiber optic terminals in the series. In FIG. 6, the port mapping scheme in the fiber optic terminal's cable stub configuration also allows for the fiber optic terminals to be identically configured from the first to the last fiber optic terminal in the series.

Turning to FIG. 6, two fiber optic terminals 618-1 and 618-2 are shown, although it is understood that additional fiber optic terminals could be connected in series to the fiber optic terminals 618-1 and 618-2. The fiber optic terminals 618-1 and 618-2 are identically configured in the embodiment shown in FIG. 6. The input to fiber optic terminal 618-1 may be a conventional twelve fiber feeder cable that is connected (plugged) into the branch cable opening 26, which may comprise a connector. Each of the fiber optic terminals 618-1 and 618-2 (as well as any additional upstream fiber optic terminals) are configured identically with an upstream cable stub 56U and a downstream cable stub 56D. A fiber optic cable assembly 57 comprises one of the cable stubs 56U or 56D. There may be multiple fiber optic cable assemblies 57, although only one is labeled in FIG. 6. Each of the cable stubs 56U and 56D may have a fiber optic connector 58 at one end, that can be connected (plugged) into the input connector of the subsequent fiber optic terminal. In FIG. 6, this results in the double stubbed fiber optic terminal 60. The fiber mapping inside both fiber optic terminals 618-1 and 618-2 assigns the same fibers to the drop ports 28 in the fiber optic terminal. In the embodiment of FIG. 6, optical fibers F5-F8 are routed to the drop ports 28 and fibers F1-F4 and F9-F12 that are routed to the pass-through connector. However, any optical fiber mapping scheme could be used within the fiber optic terminals, such as, for example, the one depicted in FIG. 2B, where fibers F1-F4 are routed to the drop port 28 and fibers F5-F12 are routed to the pass-through port. In the embodiment of FIG. 6, fibers F1-F4 and F9-F12 on the input side are mapped to ports P3-P6 and P7-P10, respectively, in the outbound pass-through connector. In this manner, each of the fiber optic terminals 618-1 and 618-2 (and any other upstream fiber optic terminals) may be configured identically, or similarly, based on fiber drop counts, and serial connection of the fiber optic terminals is enabled.

As before, alternate fiber optic terminal mapping schemes could be addressed with the appropriately mapped connecting cable stubs of FIG. 6.

The cable stubs of the embodiments disclosed above and in FIGS. 4-6 may be factory cable stubbed products or cable stubs that are made in the field. The cable stubs may be factory-prepared with preterminated or pre-connectorized optical fibers at predetermined points. Alternatively, the cable stubs may be field-prepared. The cable stubs may be enclosed and protected from exposure to the environment by a conventional closure, by a molded structure including one which may be formed by an overmolding process, a combination of enclosure and molded structure, or by any other suitable structure or process. Any cable stub configuration may be used as long as the cable stub(s) of each configuration provide the appropriate fiber mapping such that the fiber optic terminals may be serially connected to one another without regard to the order or without regard to the fibers already utilized upstream.

Many modifications and other embodiments set forth herein will come to mind to one skilled in the art to which the embodiments pertain having the benefit of the teachings presented in the foregoing descriptions and the associated drawings. These modifications include, but are not limited to, fiber optic terminals that contain a splitter and access a single fiber in the input cable and pass all remaining fibers downstream through an output (downstream port). In addition, the fiber optic terminals may access a single fiber in the input cable for the purpose of connecting a subscriber and pass the remaining fibers downstream through an output (downstream port). Further, the fiber optic terminals may contain multiple splitters, such as a first tier splitter that feeds a second tier splitter in one or more of the fiber optic terminals in the series.

Further, a series of fiber optic terminals can be serially connected with different drop port counts. For example, a series of four fiber optic terminals could be serially connected, where the first and fourth fiber optic terminals have four drop ports and the second and third fiber optic terminals have two drop ports (referred to as a 4-2-2-4 arrangement). Alternatively, there might be three terminals connected in series, one with two drop ports, one with six drop ports, and one with four drop ports (2-6-4). Any arrangement can be used, where the total number of drop ports in the series is equal to the number of optical fibers.

Moreover, although the Figures depicted herein show a twelve optical fiber arrangement, any number of optical fibers may be used. For example, the branch cable 20 in FIGS. 2A and 2B may comprise twenty-four optical fibers or thirty-six optical fibers, and the fiber optic terminals could be configured in series in any arrangement. As one non-limiting example, the branch cable 20 could include thirty-six optical fibers and there might be eleven fiber optic terminals connected in series (e.g., a 4-4-4-2-2-4-4-2-2-4-4 arrangement). Alternatively, splitters can be placed into one or more of the fiber optic terminals, as shown in FIG. 2C. Accordingly, in one non-limiting embodiment, a single optical fiber could be split by a 1×12 splitter such that a single optical fiber could enter a fiber optic terminal having four drop ports and be split into twelve fibers, four of which are mapped to the four drop ports and the other eight sent to the pass-through port of the terminal.

Various embodiments of a fiber optic cable assembly having a port mapping scheme for connecting fiber optic network devices in series are provided. To facilitate the description of the various embodiments, a fiber optic terminal, also referred to as an optical connection terminal, may be used as the fiber optic network device. It should be understood that as used herein the terms "optical connection terminal" and "fiber optic terminal" are not limited to any specific type, style, structure, construction or arrangement of fiber optic network device. Accordingly, for purposes herein, "optical connection terminal" or "fiber optic terminal" shall mean and include, but is not limited to, devices and/or structures which may typically be referred to as a local convergence point, a fiber distribution hub, a fiber distribution cabinet, a splitter cabinet, a multiport, a fiber terminal, a multiple dwelling closure, a local convergence cabinet, a pedestal, a network access point, a distribution closure, and the like.

The fiber optic terminal will typically have a base and a cover each made of a lightweight, yet rigid material, such as plastic, thermoplastic, composite or aluminum material. The base and the cover define a housing having an exterior surface. In one embodiment, the housing of the fiber optic terminal will include at least one drop connector port formed therethrough. Further, the housing comprises an interior cavity for housing fiber optic hardware, such as connector ports, adapters, optical fiber routing guides, fiber hubs and the like. The fiber optic terminal may have any of a variety of shapes that is suitable for housing fiber optic hardware and for routing and connecting optical fibers.

Further, the branch cable may enter the fiber optic terminal through a cable port, or in the alternative, the branch cable may have a connector on the end, which, in such case, would connect with an adapter seated in the branch cable port. Also, alternatively, the optical fibers in the branch cable may be spliced, for example, fusion spliced, with optical fibers in the interior cavity.

Moreover, in many of the embodiments described herein, the branch cable is a twelve fiber optical cable, but any number of optical fibers could be used. A branch cable having less or more than twelve optical fibers may be used. Within the fiber optic terminal, at least one individual optical fiber terminates at its respective connector. The optical fiber may be pre-connectorized with any suitable connector, for example, an SC, LC, ST, or FC connector, all of which are available from Corning Cable Systems LLC of Hickory, N.C. The drop cable may be connectorized or pre-connectorized with any suitable ruggedized connector, for example, an OptiTap® or OptiTip® connector available from Corning Cable Systems LLC of Hickory, N.C.

Additionally, optical fibers of the branch cable may be connected to a pass-through connector. The pass-through connector may be any type of multi-fiber connector, such as MTP or OptiTip fiber optic connectors, which are available from Corning Cable Systems LLC of Hickory, N.C. Alternatively, a splice, such as a fusion splice, may be used instead of a pass-through connector.

Further, as used herein and well known and understood in the art, the term "drop cable" shall mean and include a fiber optic cable from a subscriber premises. Also, the term "distribution cable" shall mean and include any one or more of fiber optic cables in the form of a feeder cable from a central office of a telecommunications service provider or operator, a transport cable from a head end of cable media service provider or operator, as well as a fiber optic cable that may be optically connected to a feeder cable or a transport cable and used to further distribute the optical services toward a subscriber premises. The term "branch cable" shall mean and include any fiber optic cable, including but not limited to a tether cable and/or a stub cable, as those terms are known in the art, and any other cable that may optically connect to and/or extend from a distribution cable for the purpose of optically connecting the distribution cable to a drop cable. The distribution cable, branch cable and/or drop cable may be any type of fiber optic cable having one or more optical fibers.

Further, as used herein, it is intended that the terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals.

The drop cable may be "pre-connectorized" to be readily connected to and disconnected from a drop port of the fiber optic terminal. At the other end, the drop cable may be optically connected to optical fibers within a conventional closure, such as, but not limited to, a network interface device (NID) of the types available from Corning Cable Systems LLC of Hickory, N.C. In the exemplary embodiments shown and described herein, the drop cables extend from a closure located at a subscriber premises and are optically connected through the drop ports of the fiber optic terminal to one or more optical fibers of a branch cable. In turn, the optical fibers of the branch cable are optically connected to optical fibers of the distribution cable at a mid-span access location on the distribution cable. The mid-span access location may be provided at an aerial closure, a buried closure (also referred to as a below grade closure) or an above ground telecommunications cabinet, terminal, pedestal, or the like. Likewise, the fiber optic terminal may be provided at an aerial location, such as mounted to an aerial strand between utility poles or mounted on a utility pole; at a buried location, such as within a hand-hole or below grade vault; or at an above-ground location, such as within a cabinet, terminal, pedestal, above grade vault, or the like. Thus, the fiber optic terminal provides an accessible interconnection terminal for readily connecting, disconnecting or reconfiguring drop cables in the optical network, and in particular, for optically connecting drop cables with a distribution cable. The terms "connect," "interconnect," and "connects" shall be understood to mean, without limitation, the passage, flow, transmission, or the like of an optical signal between one or more of optical cables, optical fibers, components, and/or connectors, or the like and one or more of optical cables, optical fibers, components, and/or connectors, or the like, whether or not by direct or indirect physical connection, to establish optical communication or connectivity.

A branching point may be established at a mid-span access location and/or at the end of a distribution cable. For purposes herein, reference to a mid-span access location shall be understood to also include the end of the distribution cable. The direction in the branch cable toward or facing the mid-span access location may be referred to as "upstream" and the direction facing away from the mid-span access location may be referred to as "downstream." It should be understood, though, that using the terms "upstream" or "downstream" does not indicate the direction in which the optical signals are transmitted or carried in the optical fibers. Thus, an optical signal may be transmitted in both the upstream or downstream direction.

Due to the exemplary port mapping schemes disclosed herein more than one fiber optic terminal may be included in the branch. Because more than one fiber optic terminal may be included in a branch, distributed, hierarchical architectures may be employed to position the fiber optic terminals at more convenient locations with respect to the subscriber premises. As a result, drop cables extending from a subscriber premises may be optically connected to the fiber optic network at a fiber optic terminal more closely located to the subscriber premises as opposed to a fiber optic terminal located more distantly or at the actual mid-span access location provided on the distribution cable. Thus, the overall length of the drop cables may be substantially reduced.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:

1. A fiber optic cable assembly, comprising:
   a fiber optic cable having a plurality of optical fibers disposed therein between a first end and a second end of the fiber optic cable;
   a first connector having a first plurality of ports arranged in a predetermined port configuration having a plurality of port positions, the connector terminating the plurality of optical fibers on the first end of the fiber optic cable according to a first optical fiber port mapping scheme consisting of a first subset of the plurality of port positions of the predetermined port configuration, wherein the plurality of optical fibers disposed on the second end of the fiber optic cable are configured to be connected at the second end of the fiber optic cable to a second plurality of ports arranged in the same predetermined port configuration as the first plurality of ports, according to a second optical fiber port mapping scheme consisting of a second subset of the plurality of port positions of the predetermined port configuration different from the first subset of the plurality of port positions of the predetermined port configuration; and
   a second connector having the predetermined port configuration terminating the plurality of optical fibers on the second end of the fiber optic cable according to the second optical fiber port mapping scheme, wherein:
      at least one port position of the first plurality of ports does not terminate an optical fiber of the plurality of optical fibers;
      at least one port position of the second plurality of ports does not terminate an optical fiber of the plurality of optical fibers; and
      the at least one port position of the first plurality of ports that does not terminate an optical fiber is different from the at least one port position of the second plurality of ports that does not terminate an optical fiber.

2. The fiber optic cable assembly of claim 1, wherein one or more of the plurality of optical fibers on the first end of the fiber optic cable are connected to at least one of a plurality of ports of a first fiber optic terminal.

3. The fiber optic cable assembly of claim 1, wherein one or more of the plurality of optical fibers on the second end of the fiber optic cable are each connected to respective predetermined ports of a second fiber optic terminal.

4. The fiber optic cable assembly of claim 1, wherein the fiber optic cable connects at least two fiber optic terminals in a series arrangement.

5. The fiber optic cable assembly of claim 1, wherein the fiber optic cable is comprised of a cable stub.

6. The fiber optic cable assembly of claim 5, wherein the cable stub is comprised of an upstream cable stub connected to a fiber optic terminal.

7. The fiber optic cable assembly of claim 6, wherein the cable stub is connected to a second fiber optic terminal and is configured to connect to a first fiber optic terminal or to at least one additional fiber optic terminal that is connected to the first and second fiber optic terminals in a series arrangement.

8. The fiber optic cable assembly of claim 5, wherein the fiber optic cable is comprised of a downstream cable stub connected to one or more of a first and a second fiber optic terminal.

9. The fiber optic cable assembly of claim 8, wherein the fiber optic cable is configured to be connected to a subsequent one of the first or second fiber optic terminals or on at least one additional fiber optic terminal that is connected to the first and second fiber optic terminals in a series arrangement.

10. The fiber optic cable assembly of claim 8, wherein one or more of the first and second fiber optic terminals are configured with a upstream cable stub and a downstream cable stub configured to be connected to a subsequent one of the first or second fiber optic terminals.

11. The fiber optic cable assembly of claim 5, further comprising a second connector terminating the plurality of optical fibers on the second end of the fiber optic cable according to the second optical fiber port mapping scheme.

12. A fiber optic terminal, comprising:
a housing;
a first plurality of optical ports having a predetermined port configuration, the predetermined port configuration having a plurality of port positions, in the housing and connected to a plurality of optical fibers in a distribution cable extending inside the housing; and
a fiber optic cable having a plurality of optical fibers disposed therein between a first end of the fiber optic cable according to a first optical fiber port mapping scheme comprising a first subset of the plurality of port positions of the predetermined port configuration such that at least one port position of the plurality of port positions of the predetermined port configuration is not connected to an optical fiber, and a second end of the fiber optic cable configured to be connected in the same predetermined port configuration as the first end of the fiber optic cable, according to a second optical fiber port mapping scheme comprising a second subset of the plurality of port positions of the predetermined port configuration such that at least one port position of the plurality of port positions of the predetermined port configuration is not connected to an optical fiber, wherein:
the second subset of the plurality of port positions of the predetermined port configuration is different from the first subset of the plurality of port positions of the predetermined port configuration; and
the plurality of optical fibers on the first end of the fiber optic cable are connected to the first subset of the first plurality of optical ports.

13. The fiber optic terminal of claim 12, wherein the fiber optic cable is configured to optically connect certain predetermined ones of the plurality of optical fibers routed from one of the first plurality of optical ports to respective predetermined ports of a second plurality of optical ports on a second fiber optic terminal.

14. The fiber optic terminal of claim 12, wherein the fiber optic terminal comprises at least one splitter configured to split an optical signal carried by one of the plurality of optical fibers into a plurality of optical signals each carried by one of a plurality of split optical fibers.

15. A fiber optic assembly, comprising:
a plurality of first optical ports having a predetermined port configuration having a plurality of port positions in a first fiber optic terminal;
a plurality of second optical ports having the same predetermined port configuration as the plurality of first optical ports in a second fiber optic terminal; and
a fiber optic cable having a plurality of optical fibers disposed therein between a first end of the fiber optic cable according to a first optical fiber port mapping scheme comprising a first subset of the plurality of port positions of the predetermined port configuration such that at least one port position of the plurality of port positions of the predetermined port configuration is not connected to an optical fiber, and a second end of the fiber optic cable according to a second optical fiber port mapping scheme comprising a second subset of the plurality of port positions of the predetermined port configuration such that at least one port position of the plurality of port positions of the predetermined port configuration is not connected to an optical fiber, wherein:
the second subset of the plurality of port positions of the predetermined port configuration is different from the first subset of the plurality of port positions of the predetermined port configuration; and
the plurality of optical fibers on the first end of the fiber optic cable are connected to the plurality of first optical ports according to the first optical fiber port mapping scheme, and the plurality of optical fibers on the second end of the fiber optic cable are connected to the plurality of second optical ports according to the second optical fiber port mapping scheme.

16. The fiber optic assembly of claim 15, wherein the plurality of first optical ports are terminated in a first connector having the predetermined port configuration in the first fiber optic terminal.

17. The fiber optic assembly of claim 15, wherein the plurality of second optical ports are terminated in a second connector having the predetermined port configuration in the second fiber optic terminal.

18. The fiber optic assembly of claim 15, further comprising a first connector having the predetermined port configuration terminating the plurality of optical fibers on the first end of the fiber optic cable.

19. The fiber optic assembly of claim 15, further comprising a second connector having the predetermined port configuration terminating the plurality of optical fibers on the second end of the fiber optic cable.

20. The fiber optic assembly of claim 15, wherein the plurality of first optical ports in the first fiber optic terminal comprises a first passthrough port having the predetermined port configuration.

21. The fiber optic assembly of claim 15, wherein the first and second fiber optic terminals are connected in a series arrangement.

22. The fiber optic cable assembly of claim 1, wherein the second end of the fiber optic cable is adapted to be connected to a second connector for terminating the plurality of optical fibers on the second end of the fiber optic cable according to the second optical fiber port mapping scheme.

23. The fiber optic terminal of claim 12, further comprising a second connector having the predetermined port configuration terminating the plurality of optical fibers on the second end of the fiber optic cable according to the second optical fiber port mapping scheme, wherein:

at least one port position of the first plurality of ports does not terminate an optical fiber of the plurality of optical fibers;

at least one port position of the second plurality of ports does not terminate an optical fiber of the plurality of optical fibers; and the at least one port position of the first plurality of ports that does not terminate an optical fiber is different from the at least one port position of the second plurality of ports that does not terminate an optical fiber.

* * * * *